UNITED STATES PATENT OFFICE.

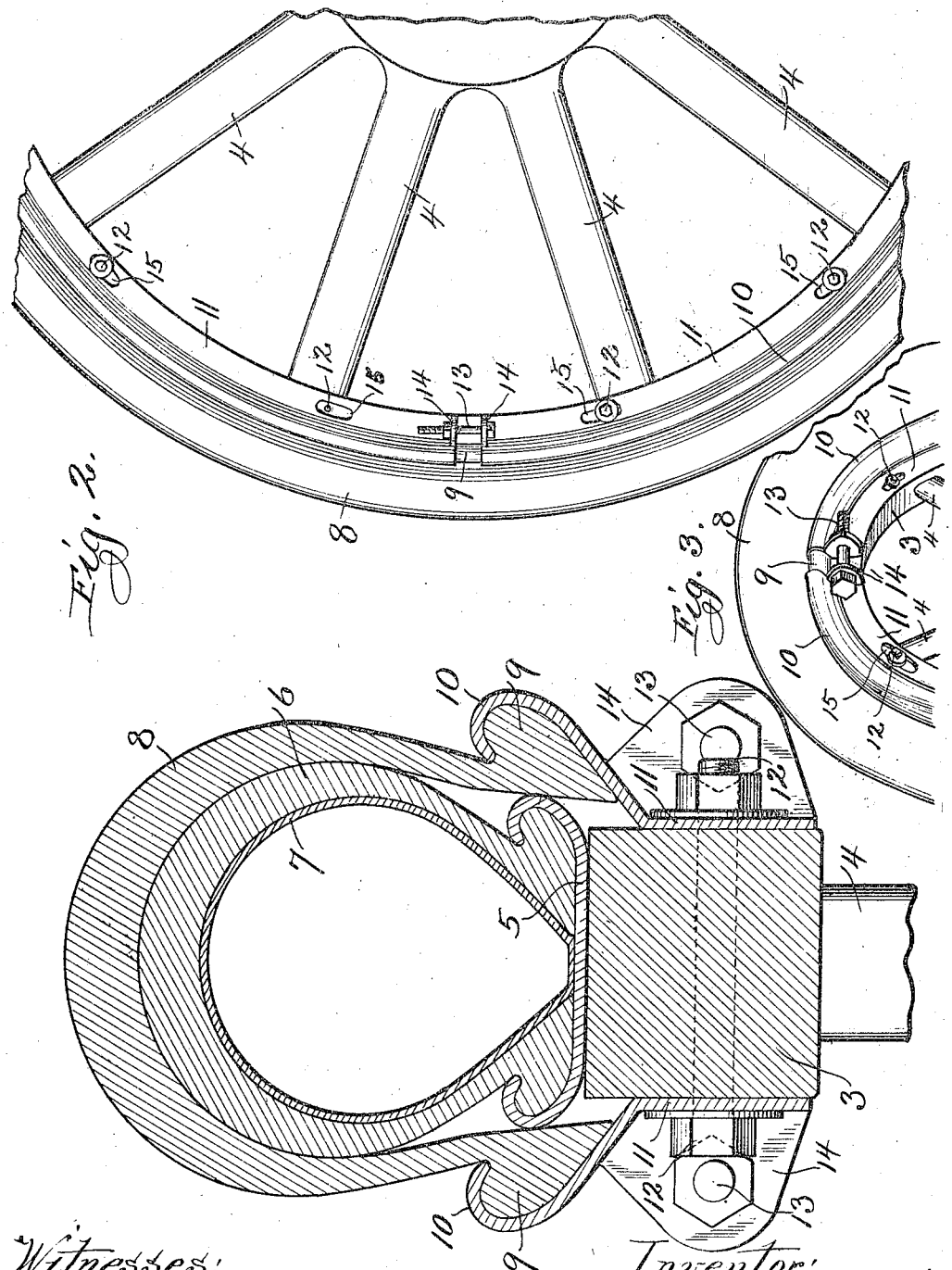

ALONZO C. MATHER, OF CHICAGO, ILLINOIS.

PNEUMATIC TIRE.

1,132,788. Specification of Letters Patent. Patented Mar. 23, 1915.

Application filed May 19, 1913. Serial No. 768,546.

*To all whom it may concern:*

Be it known that I, ALONZO C. MATHER, a citizen of the United States, residing at Chicago, in the county of Cook and State of Illinois, have invented a new and useful Pneumatic Tire, of which the following is a specification.

My invention relates to pneumatic tires used on motor vehicles and the objects of my improvements are first, to prevent blowouts; second, to substantially double the life of the tire; third, to provide an inner and outer casing of flexible material and prevent the creeping of the outer casing; fourth to provide means for drawing the outer casing in its entirety tightly over the inner casing; fifth, to make a cheap and durable construction and other features to become apparent from the description to follow.

Heretofore pneumatic tires have been made comprising an inner or air tube and an outer casing to envelop the same. The outer casing was made sufficiently strong and heavy to resist the outward pressure of air within the inner tube even after considerable wear and deterioration, but eventually the tire would have what is termed a blowout if it is kept in service a sufficient length of time. Blowouts, especially during the time the motor vehicle is being driven at a rapid rate, are very dangerous on account of the almost unavoidable accident resulting therefrom by the vehicle skidding. By the use of my invention the possibility of a blowout is substantially eliminated, the outer casing which gets all the wear from traction and exposure to the elements can be worn completely through and the inner casing which resists the outward air pressure is entirely protected against wear from traction and exposure to the elements.

My invention consists of providing an outer casing to entirely envelop the casing which contains the inner or air tube, and means for retaining the said outer casing in proper position.

To describe my invention so that others versed in the art to which it pertains can make and use the same, I have illustrated it on the accompanying sheet of drawing forming a part of this specification, in which:—

Figure 1 is a cross sectional view of a tire embodying my invention. Fig. 2 is a fragmentary side elevation of the same and Fig. 3, is a perspective view showing a clamping means forming a part of my invention.

Similar reference characters refer to similar parts throughout all views.

The wheel felly is represented at 3 and the spokes at 4. The periphery of the felly 3 is provided with the usual clencher rim 5, to which the inner casing 6 is clenched in the usual way by inflating the inner tube 7. The parts thus far described form no part of my invention and are preferably of the standard make and size. An outer casing 8 of flexible material is provided to fit snugly over the inner casing 6 and has the usual clencher edges 9 which are arranged to fit into the hook shaped flanges 10 of the plates or rims 11 secured to the opposite sides of the felly 3 by means of bolts 12. The rims 11 are rings cut at one point to facilitate placing them in proper position on the clencher edges 9 of the outer casing 8. The adjacent ends of the rims 11 formed by cutting them are provided with means for pulling them together as for instance the screw bolt 13 passing through suitable laterally extending lugs 14 integral with the rims 11.

It will be seen that the outer casing 8 entirely covers the inner casing 6, thus only the outer casing 8 becomes worn and deteriorated from contact with the ground and the elements. The inner casing 6 is made sufficiently heavy and strong to easily resist the air pressure within the inner tube 7 so that if it does not become worn or deteriorated by contact with the elements its life will be greatly prolonged. The inner casing 6 is practically entirely protected against wear by the outer casing which can be replaced by a new one as often as found necessary. The holes 15 in the rims 11 through which the bolts 12 pass are made considerable larger than the bolts so as to permit the slight shifting of the said rims when they are being drawn tightly together by means of the screw bolts 13.

Having thus fully described my invention what I claim as new and desire to secure by Letters Patent of the United States is:—

1. In a device of the class described, a tire of an inherent stable shape, mounted on a wheel, an outer casing of flexible material fitted to envelop said tire, clencher edges on said outer casing, flat rings mounted on either side of the wheel felly, provided with hook shaped edges to engage said clencher edges of the outer casing, said flat rings provided with a plurality of elongated perforations, fastening devices secured to the wheel felly and slidingly engaging in said perforations to secure said rings to the felly and permit circumferential and radical movement of the rings with respect to the felly and means for forcing said flat rings radically toward the center of the wheel to pull the outer casing tightly over the said tire.

2. In a device of the class described, a tire of an inherent stable shape, mounted on a wheel, an outer casing of flexible material fitted to envelop said tire, rings mounted on either side of the wheel felly engaging the edges of said casing, said rings provided with a plurality of elongated perforations, fastening devices secured to the wheel felly and slidingly engaging in said perforations to secure said rings to the felly and permit circumferential and radical movement of the rings with respect to the felly and means for forcing said rings radically toward the center of the wheel to pull the outer casing tightly over the tire.

In testimony whereof I have signed my name to this specification in presence of two subscribing witnesses this 17 day of May 1913, at Chicago, Illinois.

ALONZO C. MATHER.

Witnesses:
FRANK A. WATKINS,
A. H. DOUGAL.